(12) United States Patent
Hashiguchi

(10) Patent No.: US 11,549,907 B2
(45) Date of Patent: Jan. 10, 2023

(54) CERAMIC APPLIED ELECTRONIC DEVICE AND CONNECTOR

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 299 days.

(21) Appl. No.: 16/988,798

(22) Filed: Aug. 10, 2020

(65) Prior Publication Data

US 2021/0131997 A1 May 6, 2021

(30) Foreign Application Priority Data

Oct. 30, 2019 (JP) ............................. JP2019-197326

(51) Int. Cl.
*G01N 27/407* (2006.01)
*G01N 27/406* (2006.01)

(52) U.S. Cl.
CPC ....... *G01N 27/407* (2013.01); *G01N 27/4062* (2013.01)

(58) Field of Classification Search
CPC ............. G01N 27/4062; G01N 27/407; G01N 27/4071; G01R 1/0416; H01R 24/62; H01R 11/22; H01R 13/508; H01R 13/6683; H01R 2107/00; H01R 4/185; H01R 12/592; H01R 12/721; H01R 13/432; H01R 13/533; H01R 43/16

See application file for complete search history.

(56) References Cited

U.S. PATENT DOCUMENTS

| 6,082,175 | A | 7/2000 | Yoshikawa et al. |
| 6,672,136 | B2 * | 1/2004 | Kojima .............. G01N 27/4071 73/23.31 |
| 7,563,118 | B1 * | 7/2009 | McCauley ........... H01R 13/533 439/260 |

(Continued)

FOREIGN PATENT DOCUMENTS

JP 10-253579 A 9/1998

OTHER PUBLICATIONS

U.S. Appl. No. 17/010,227 to Osamu Hashiguchi, filed Sep. 2, 2020.

(Continued)

*Primary Examiner* — Nimeshkumar D Patel
*Assistant Examiner* — Gedeon M Kidanu
(74) *Attorney, Agent, or Firm* — Greenblum & Bernstein, P.L.C.

(57) ABSTRACT

A connector includes two insulators which hold contacts connected to lead wires and are arranged on two surfaces of a ceramic element, a spring component which includes two cantilever-shaped spring pieces and has a flexed portion at a middle portion of each spring piece, and a cylindrical sleeve. The two spring pieces are located over two outer surfaces of the two insulators, and are elastically deformed toward the two insulators by the sleeve hanging over the two spring pieces. The two insulators pushed by the flexed portions of the two elastically deformed spring pieces hold the ceramic element from two sides to push the contacts against the terminal electrodes.

2 Claims, 18 Drawing Sheets

(56) References Cited

U.S. PATENT DOCUMENTS

| | | | | |
|---|---|---|---|---|
| 7,798,855 B2* | 9/2010 | Gustin | ............... | H01R 13/6683 |
| | | | | 439/620.21 |
| 8,047,051 B2* | 11/2011 | McCauley | ......... | G01N 27/4078 |
| | | | | 73/23.31 |
| 8,287,294 B2* | 10/2012 | Masuda | ............... | G01N 27/407 |
| | | | | 439/260 |
| 8,636,532 B2* | 1/2014 | Masuda | ............. | G01N 27/4062 |
| | | | | 204/426 |
| 8,677,804 B2* | 3/2014 | Masuda | ............... | G01N 27/407 |
| | | | | 439/263 |
| 2001/0025522 A1* | 10/2001 | Kojima | ............. | G01N 27/4071 |
| | | | | 73/31.05 |
| 2002/0144538 A1* | 10/2002 | Yamada | ............. | G01N 27/4062 |
| | | | | 73/31.05 |
| 2009/0156045 A1* | 6/2009 | Gustin | ............... | H01R 13/6683 |
| | | | | 439/345 |
| 2012/0031171 A1* | 2/2012 | Masuda | ............. | G01N 27/4062 |
| | | | | 73/31.05 |
| 2012/0192653 A1* | 8/2012 | Masuda | ............. | G01N 27/4062 |
| | | | | 73/756 |

OTHER PUBLICATIONS

U.S. Appl. No. 16/918,417 to Osamu Hashiguchi, filed Jul. 1, 2020.

* cited by examiner

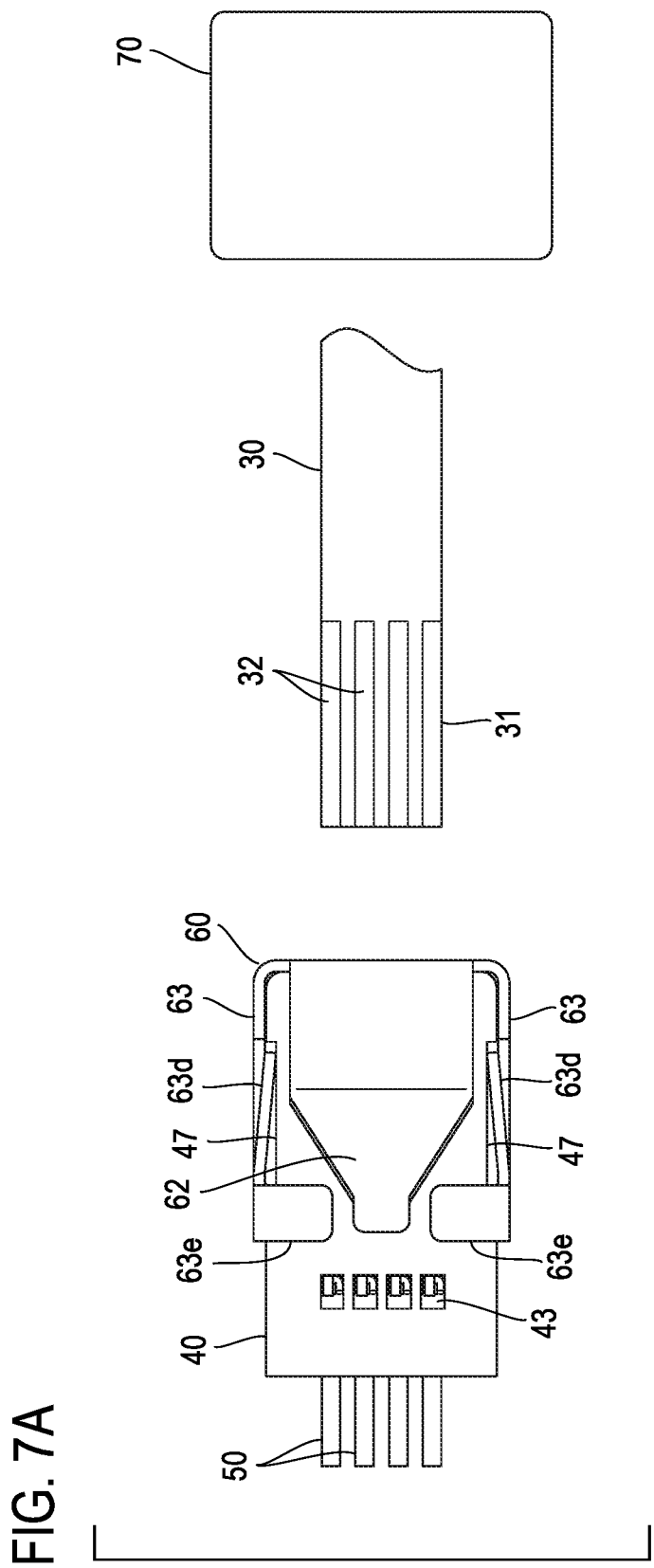

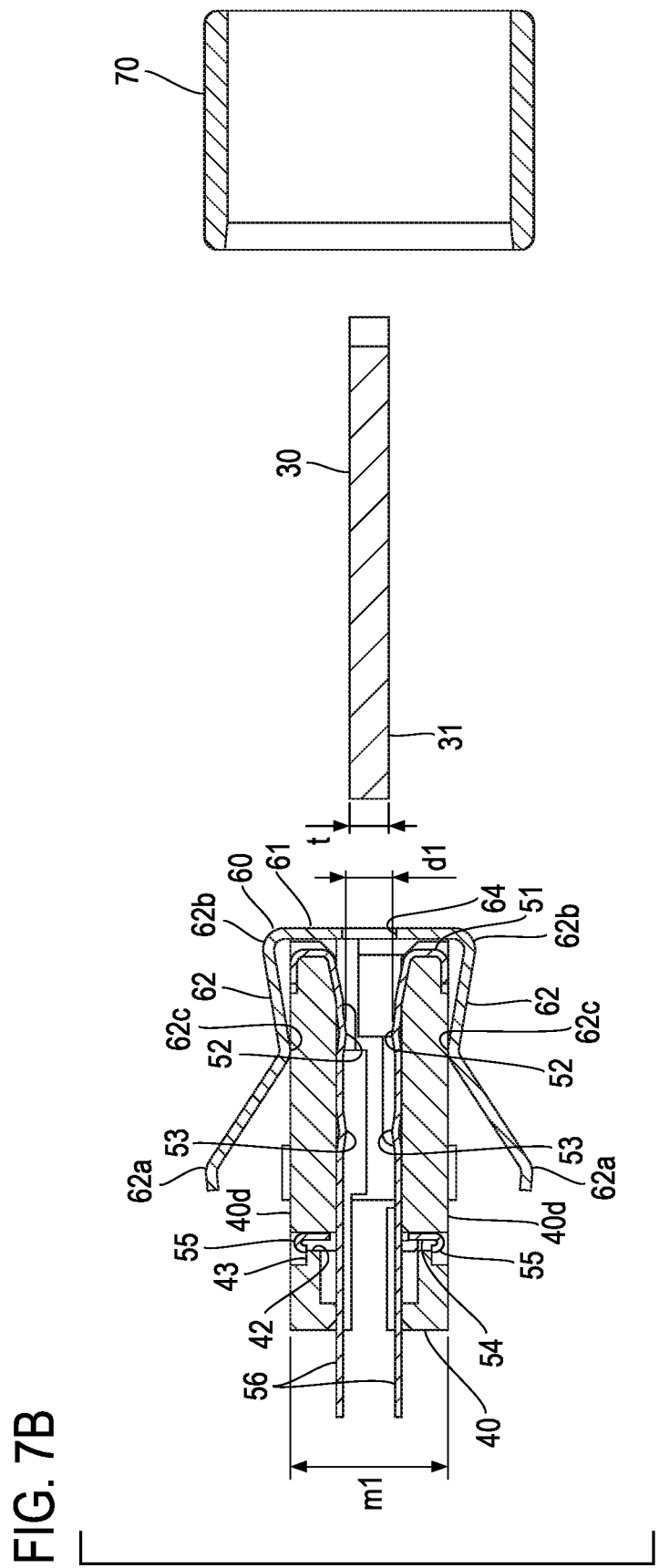

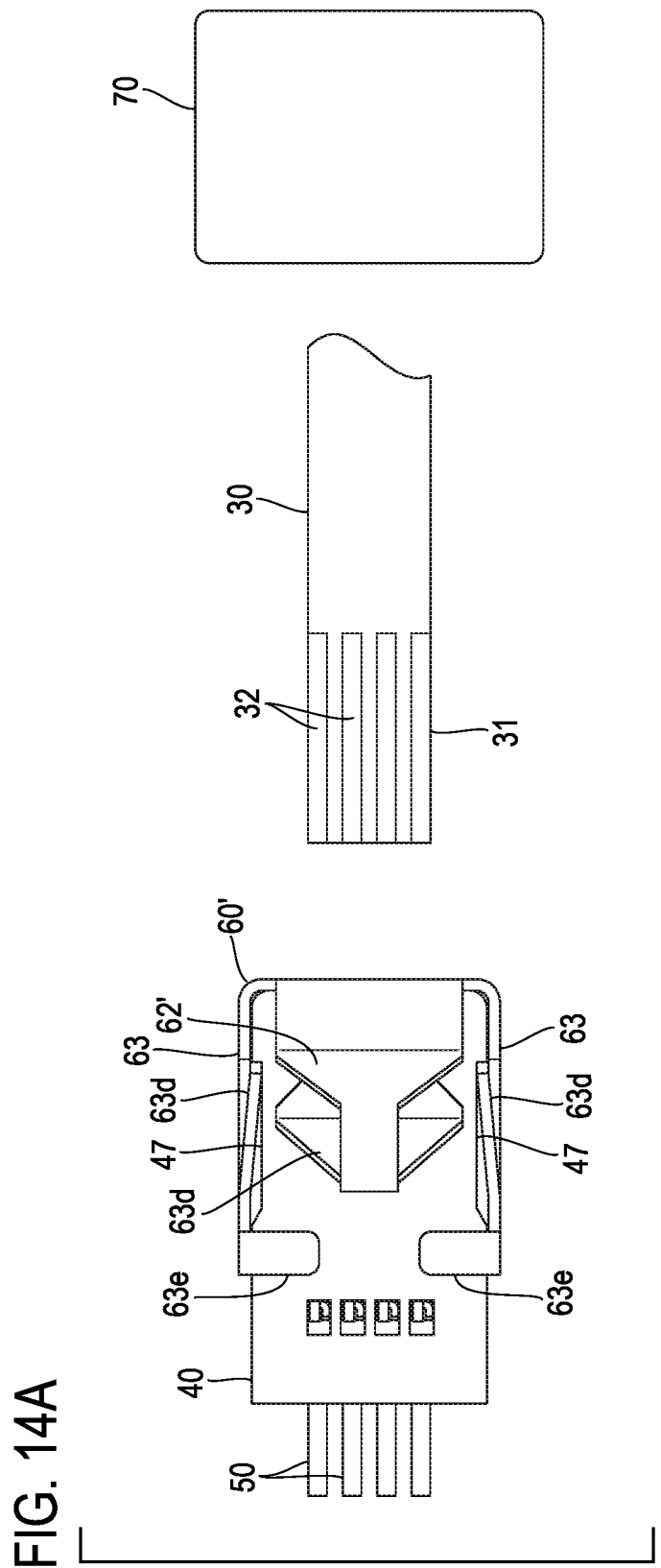

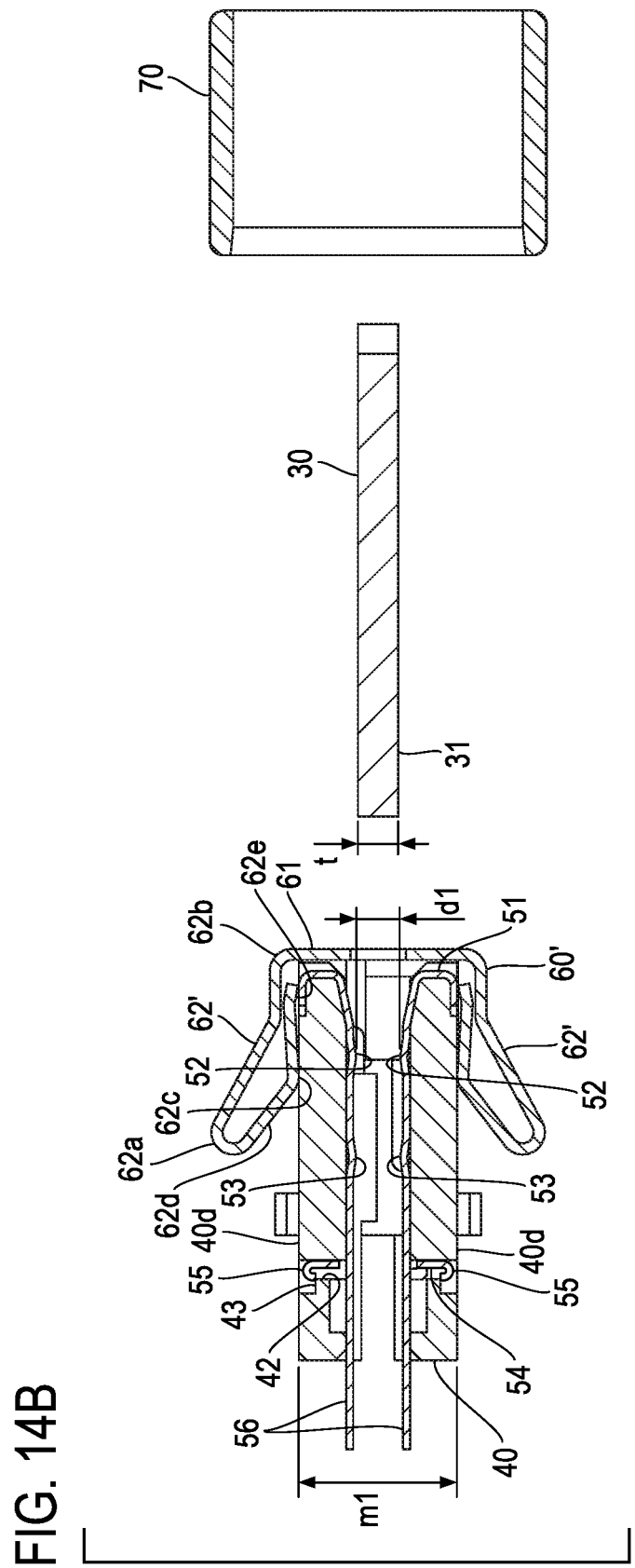

CERAMIC APPLIED ELECTRONIC DEVICE AND CONNECTOR

TECHNICAL FIELD

This invention relates to a ceramic applied electronic device, such as a nitrogen oxides ($NO_x$) sensor or an oxygen sensor incorporating a ceramic element, and also relates to a connector used in the ceramic applied electronic device.

BACKGROUND ART

FIG. 1 illustrates an oxygen sensor for detecting the concentration of oxygen in exhaust gas from a vehicle, which is disclosed as a prior art associated with a ceramic applied electronic device in Japanese Patent Application Laid Open No. H10-253579. FIG. 2 illustrates an assembly in a portion A in FIG. 1.

The oxygen sensor includes a ceramic element 11, and the ceramic element 11 is fixed in a main metal shell 12 by, for example, a glass seal 13. A cover 15 which covers a projecting portion of the ceramic element 11 is attached to an outer perimeter of a distal end of the main metal shell 12. Openings 15a which guide exhaust gas flowing through an exhaust pipe into the cover 15 are formed in the cover 15.

The ceramic element 11 has an elongated shape and is square in sectional shape. Two electrode terminal portions 16 are formed on each of one outer surface and the other outer surface of one end portion of the ceramic element 11 (see FIG. 2). A conducting wire (specifically an elongated thin metal plate) 17 is connected to each electrode terminal portion 16. Each conducting wire 17 is connected to a lead wire 19 via a connector portion 18. Four lead wires 19 extend through a grommet 21 and extend further to outside the grommet 21. Distal end portions of the four lead wires 19 are coupled to a connector plug 22. Reference numeral 14 in FIG. 1 denotes a cylindrical metal casing, and reference numeral 23 denotes a protective tube which protects the lead wires 19.

A coupling unit 25 which is composed of the ceramic element 11, the conducting wires 17, and insulating plates 24 is constructed by placing one conducting wire 17 on each electrode terminal portion 16 and placing the insulating plates 24 on the conducting wires 17. In this example, the electrode terminal portions 16 and the conducting wires 17 are connected to each other by tightening the coupling unit 25 with a metal ring 26 such that the coupling unit 25 fits tightly, as illustrated in FIG. 2.

That is, the coupling unit 25 is rigidly tightened up by the metal ring 26, and each conducting wire 17 is pressed onto the electrode terminal portion 16 of the ceramic element 11. As a result, the electrode terminal portion 16 and the conducting wire 17 are electrically connected to each other.

With the above-described connection structure, contact forces differ due to variation in dimensions among the ceramic elements 11 or the insulating plates 24 that are components of the coupling units 25, and a stable contact force may not be obtained between the conducting wire 17 and the electrode terminal portion 16.

Additionally, a large force is needed to attach the metal ring 26 to the coupling unit 25, and assembly work is not easy in that respect.

BRIEF SUMMARY OF THE INVENTION

An object of this invention is to provide a connector which implements electrical connection of a ceramic element with good reliability and workability in a ceramic applied electronic device and provide a ceramic applied electronic device including the connector.

The following technical matters are described simply to facilitate the understanding of the main points of the present invention, not to limit the invention claimed in the claims explicitly or implicitly and not to express the possibility of accepting such a limitation that is imposed by a person other than those who will benefit from the present invention (for example, the applicant and the right holder). The general outline of the present invention described from other perspectives can be understood from, for example, the claims of this application as originally filed at the time of application.

A connector according to the present invention includes two insulators, a spring component, and a cylindrical sleeve. The spring component is mounted on the two insulators for holding a ceramic element from two sides. The spring component is elastically deformed by mounting the cylindrical sleeve on the spring component. The elastically deformed spring component pushes the two insulators so as to bring the two insulators closer to each other, and the two insulators tightly hold the ceramic element from the two sides. In this state, contacts mounted on each of the two insulators are pushed hard against terminal electrodes of the ceramic element.

These and other objects, features and advantages of the present invention will become apparent from the detailed description taken in conjunction with the accompanying drawings.

Effects of the Invention

This invention implements electrical connection of a ceramic element with good reliability and workability in a ceramic applied electronic device.

BRIEF DESCRIPTION OF THE DRAWINGS

The subject matter, which is regarded as the invention, is particularly pointed out and distinctly claimed in the claims at the conclusion of the specification. The present invention itself, and manner in which it may be made or used, if any, may be better understood after a review of the following description in connection with the accompanying drawings in which:

FIG. 7A is a plan view of the connector to which the ceramic element is not connected;

FIG. 7B is a sectional view of the connector to which the ceramic element is not connected;

FIG. 14A is a plan view of the connector to which the ceramic element is not connected;

FIG. 14B is a sectional view of the connector to which the ceramic element is not connected;

LIST OF REFERENCE NUMERALS

Figure 1:
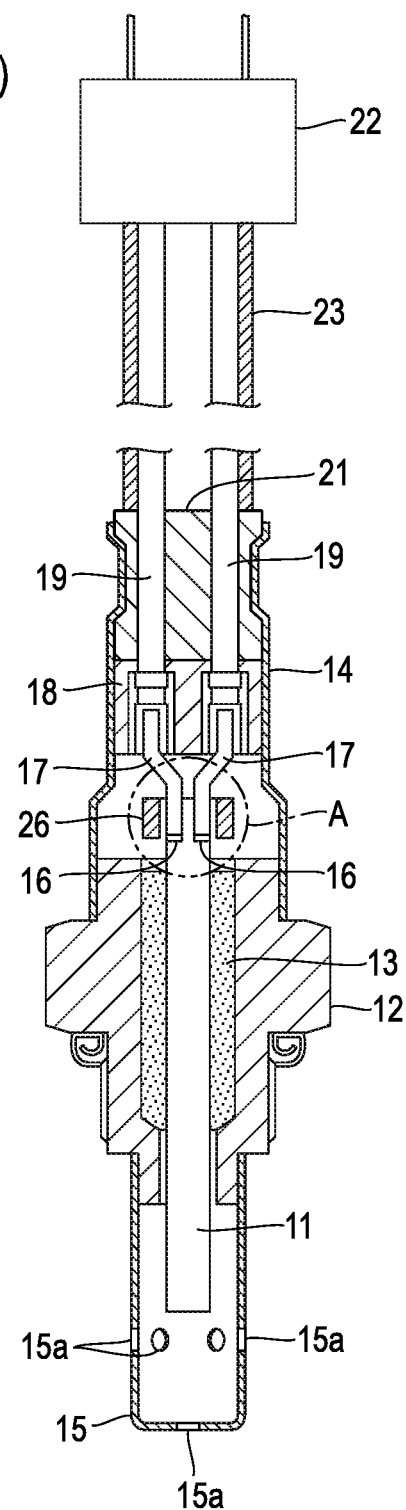
FIG. 1 is a sectional view illustrating a ceramic applied electronic device according to a conventional technique.
Figure 2:
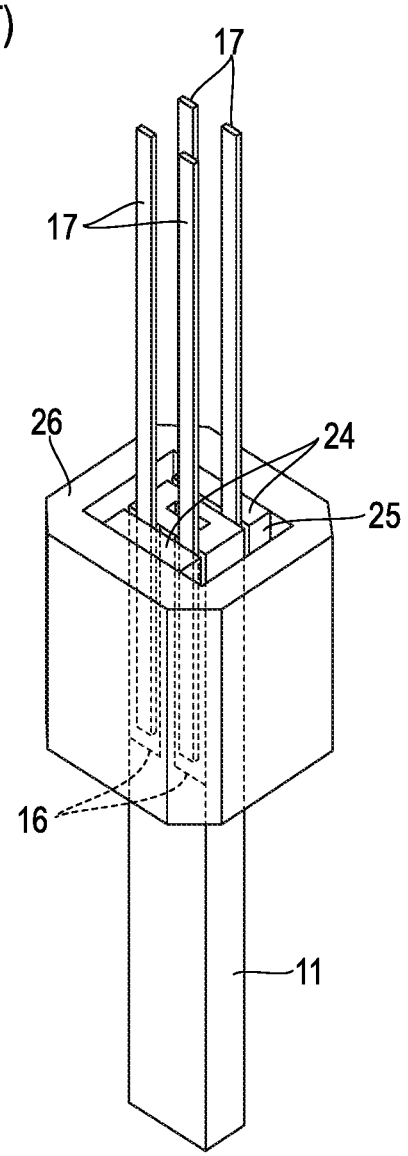
FIG. 2 is a perspective view illustrating details of a portion A in FIG. 1.
Figure 3A:
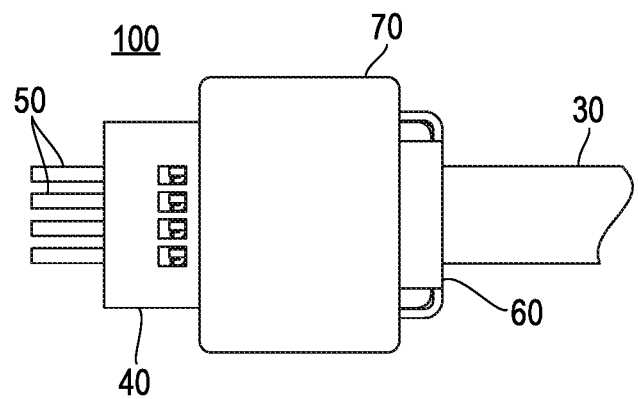
FIG. 3A is a plan view of a connector to which a ceramic element is connected.
Figure 3B:
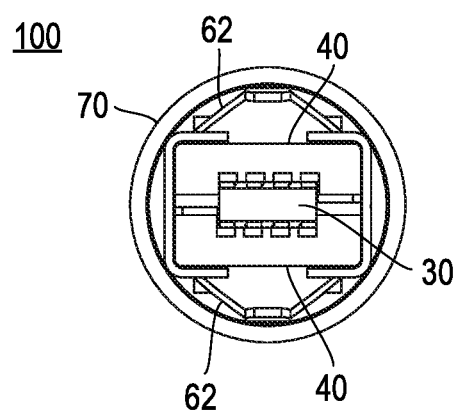
FIG. 3B is a left side view of the connector to which the ceramic element is connected.
Figure 3C:
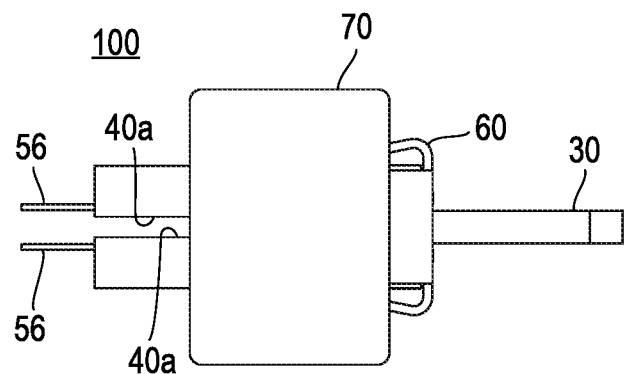
FIG. 3C is a front view of the connector to which the ceramic element is connected.
Figure 3D:
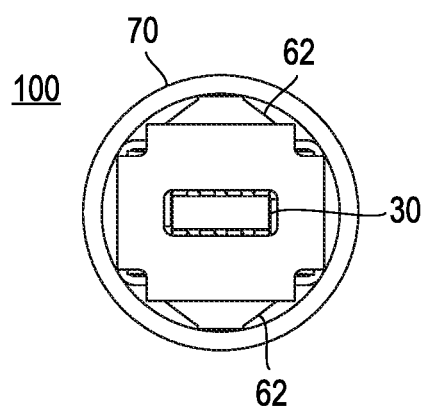
FIG. 3D is a right side view of the connector to which the ceramic element is connected.

With regard to reference numerals used, the following numbering is used throughout the drawings.

11: ceramic element
12: main metal shell
13: glass seal
14: cylindrical metal casing
15: cover
15a: opening
16: electrode terminal portion
17: conducting wire
18: connector portion
19: lead wire
21: grommet
22: connector plug
23: protective tube
24: insulating plate
25: coupling unit
26: metal ring
30: ceramic element
31: base end portion
32: terminal electrode
40: insulator
40a: lower surface
40b: side surface
40c: side surface
40d: upper surface
41: groove
42: hole
43: stopping portion
44: projecting portion
45: regulation portion
46: regulation portion
47: recessed portion
50: contact
51: distal end portion
52: contact portion
53: contact portion
54: rising portion
55: hook portion
56: connection portion
60: spring component
60': spring component
61: flat plate portion
62: spring piece
62': spring piece
62a: free end
62b: fixed end
62c: flexed portion
62d: turnback portion
62e: distal end
62f: flexed portion
63: extension portion
63a: base end portion
63b: middle portion
63c: distal end portion
63d: retaining piece
63e: bent portion
64: opening
70: sleeve
80: protective cover
81: inner protective cover
81a: hole
82: outer protective cover
82a: hole
90: sensor assembly
91: main metal shell
91a: threaded portion
92: internal cylinder
93: external cylinder
94a: ceramic supporter
94b: ceramic supporter
94c: ceramic supporter
95a: ceramic powder
95b: ceramic powder
96: lead wire
97: rubber plug
100: connector
200: connector

DETAILED DESCRIPTION

Embodiments of this invention will be described with reference to the drawings.

FIGS. 3A, 3B, 3C, 3D, 4A, and 4B illustrate a connector 100 according to an embodiment. The connector 100 is used to connect a ceramic element incorporated in a ceramic applied electronic device and lead wires for connection with an external apparatus. FIGS. 3A, 3B, 3C, 3D, 4A, and 4B illustrate a state in which a ceramic element 30 is connected to the connector 100.

Figure 5:
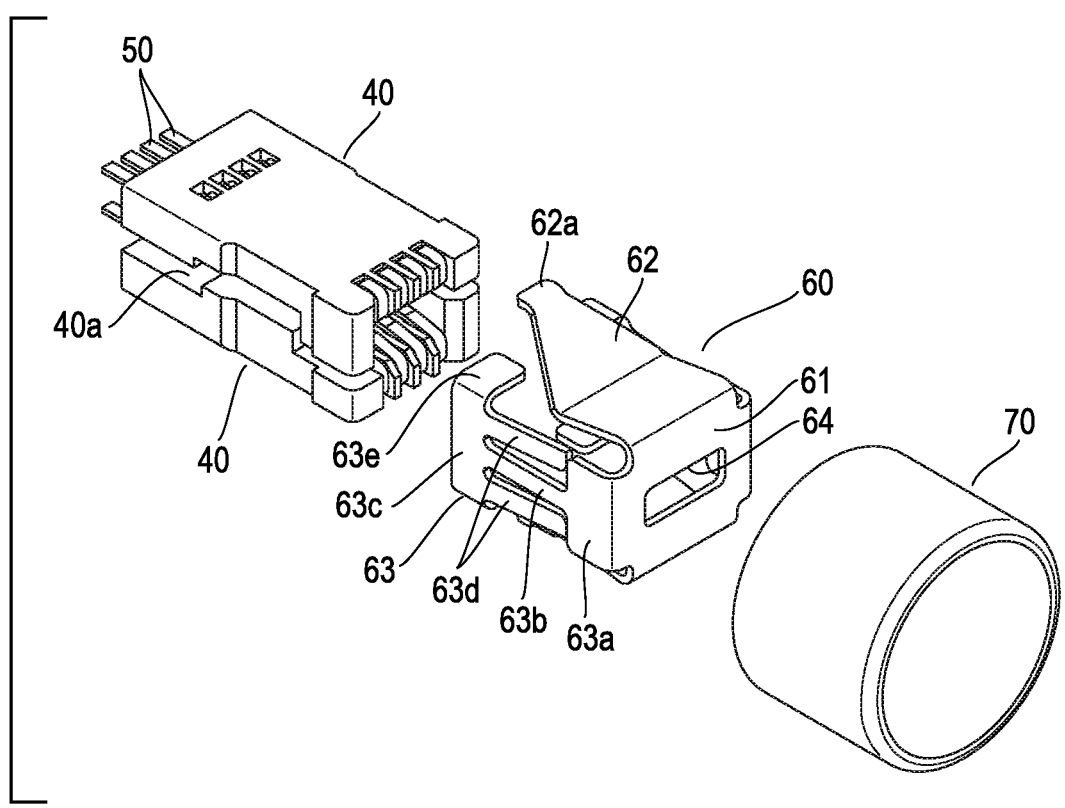
FIG. 5 is a perspective view of the connector which is partially exploded.
Figure 6A:
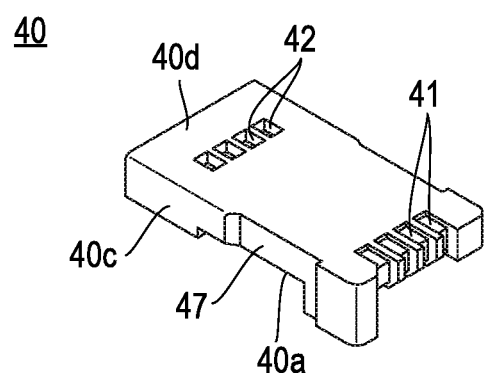
FIG. 6A is a perspective view of an insulator.
Figure 6B:
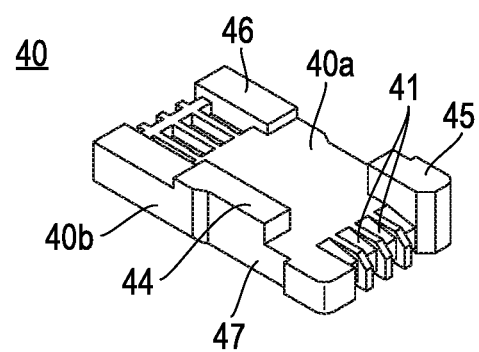
FIG. 6B is an upside-down perspective view of the insulator illustrated in FIG. 6A.
Figure 8:
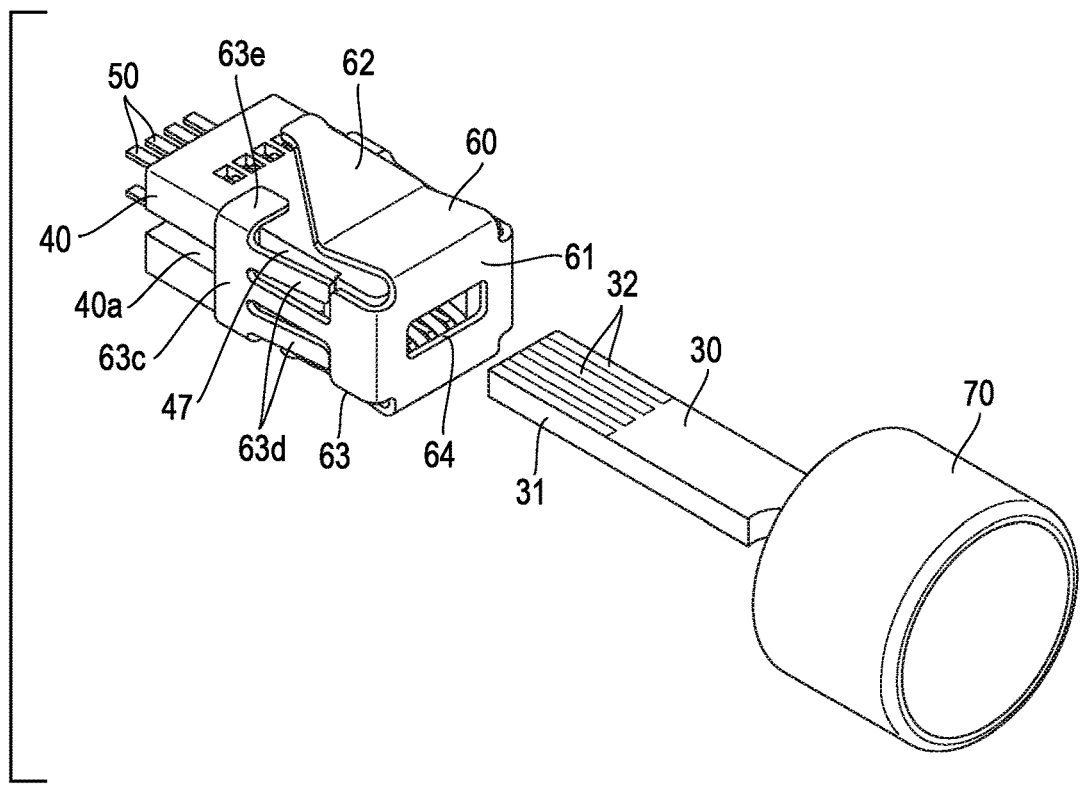
FIG. 8 is a perspective view of the connector to which the ceramic element is not connected.

The connector 100 includes two insulators 40, eight contacts 50, a spring component 60, and a circular cylindrical sleeve 70 in this example. FIG. 5 is a partial exploded view of the connector 100, and FIGS. 6A and 6B illustrate details of the insulator 40. FIGS. 7A, 7B, and 8 illustrate a state before the ceramic element 30 is connected to the connector 100.

The two insulators 40 each hold four contacts 50 aligned at a lower surface 40a in this example. The two insulators 40 are arranged such that the lower surface 40a of one of the two insulators 40 and the lower surface 40a of the other face each other. Four grooves 41, four holes 42 and stopping portions 43 (see FIG. 7B) are formed at the insulator 40, as illustrated in FIGS. 6A and 6B, the four grooves 41 housing distal ends of the contacts 50 which catch on the four grooves 41, the four holes 42 receiving insertion of parts of the contacts 50, and the stopping portions 43 stopping the contacts 50. Each stopping portion 43 is located in the hole 42.

A projecting portion 44 is formed at one end in a width direction (that is, an array direction of the grooves 41) of the lower surface 40a of the insulator 40, and regulation portions 45 and 46 project at the other end. The projecting portion 44 and the regulation portions 45 and 46 serve as spacers. In a state in which the two insulators 40 are arranged with the one lower surface 40a of the two insulators 40 and the other lower surface 40a facing each other, the projecting portion 44 of the one insulator 40 is located between the regulation portions 45 and 46 of the other insulator 40, and the projecting portion 44 of the other insulator 40 is located between the regulation portions 45 and 46 of the one insulator 40.

A recessed portions 47 is formed at each of side surfaces 40b and 40c located at two ends in the width direction of the insulator 40. The insulator 40 is made of ceramic, such as an alumina sintered body.

Each contact 50 is held by the insulator 40, as illustrated in FIGS. 5, 7A, and 7B. The contact 50 includes a distal end portion 51 in a curved shape, contact portions 52 and 53 which are slightly bent, a rising portion 54 which is to be inserted into the hole 42 of the insulator 40, a hook portion 55 which is formed at a distal end of the rising portion 54, and a connection portion 56 which extends straight. The distal end portion 51 is housed in the groove 41 of the insulator 40 by being hooked around the groove 41 of the insulator 40. The contact portions 52 and 53 are electric contacts which are to come into contact with a terminal electrode of the ceramic element 30. The hook portion 55 is hooked on the stopping portion 43 of the insulator 40. The connection portion 56 is led out from the insulator 40.

The spring component 60 made of metal has a square flat plate portion 61, two cantilever-shaped spring pieces 62 which extend from two ends (that is, two sides facing each other) of the flat plate portion 61 so as to face each other, and two extension portions 63 which extend from the remaining two sides of the flat plate portion 61 so as to face each other, as illustrated in FIGS. 5, 7A, and 7B. A square opening 64 is formed in a center of the flat plate portion 61. The two spring pieces 62 and the two extension portions 63 are formed by bending, toward a same direction, plate portions extending from the flat plate portion 61 in four directions.

A flexed portion 62c is formed at a middle portion between a free end 62a of the spring piece 62 and a fixed end 62b located at a boundary between the spring piece 62 and the flat plate portion 61, and the spring piece 62 having the flexed portion 62c has a V-shape. A plate portion from the flexed portion 62c of the spring piece 62 to the free end 62a has a trapezoidal shape which decreases in width toward the free end 62a. The free end 62a is slightly bent inward.

The extension portion 63 includes a wide base end portion 63a, a narrow middle portion 63b which is continuous with the base end portion 63a, a wide distal end portion 63c which is continuous with the middle portion 63b, and two retaining pieces 63d. The two retaining pieces 63d extends from the distal end portion 63c toward the base end portion 63a, and the middle portion 63b is interposed between the two retaining pieces 63d. The two retaining pieces 63d are each slightly bent inward. A bent portions 63e which is bent inward is formed at each of two ends in the width direction of the distal end portion 63c.

The spring component 60 is formed of, for example, a stainless material, and the cylindrical sleeve 70 is also formed of a stainless material.

The spring component 60 is mounted on the two insulators 40 holding the contacts 50, as illustrated in FIGS. 7A, 7B, and 8. The two insulators 40 are positioned by a jig (not illustrated) such that a spacing between the contact portions 52 (53) of the facing contacts 50 has a magnitude indicated by d1.

In a state in which the spring component 60 is mounted on the two insulators 40, the flat plate portion 61 is located beside one ends of the two insulators 40, at which the distal end portions 51 of the contacts 50 are located, and the two spring pieces 62 are located over upper surfaces 40d, that is, beside outer surfaces of the two insulators 40. The distal end portions 63c and the bent portions 63e of the two extension portions 63 in the spring component 60 embrace the two insulators 40, and a distal end of each retaining piece 63d is into the recessed portion 47 of the insulator 40. The distal ends of the retaining pieces 63d that are hooked on the insulator 40 prevent the spring component 60 from coming off from the two insulators 40.

A base end portion 31 of the ceramic element 30 which is to be connected to lead wires for connection with an external apparatus by the connector 100 is inserted between the two insulators 40 in the state illustrated in FIGS. 7A, 7B, and 8. Four terminal electrodes 32 are arrayed on a surface on the obverse side of the base end portion 31, as illustrated in FIGS. 7A and 8, and four terminal electrodes 32 are also arrayed on a surface on the reverse side. The terminal electrodes 32 are not illustrated in detail in FIGS. 7B, 3B, and 4B.

Figure 9:
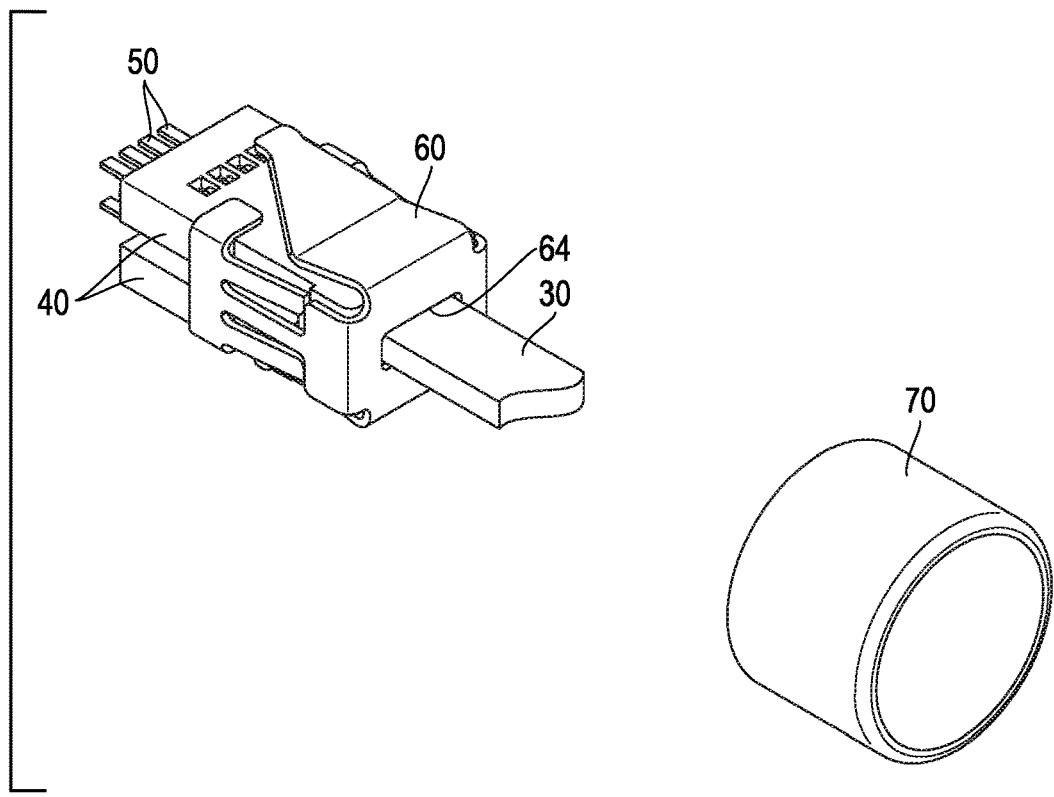
FIG. 9 is a perspective view of the connector to which a sleeve is not attached.

Before insertion of the base end portion 31 between the two insulators 40, the ceramic element 30 is passed through the sleeve 70. The base end portion 31 of the ceramic element 30 after the passage through the sleeve 70 is inserted between the two insulators 40 through the opening 64 of the spring component 60 (see FIG. 9). After the insertion, the sleeve 70 is moved to a position illustrated in FIGS. 3A and 4B, thereby completing connection of the connector 100 and the ceramic element 30. When the sleeve 70 is moved and positioned at the position illustrated in FIGS. 3A and 4B, the positioning jig described above is released from the two insulators 40.

Letting t be a thickness of the ceramic element 30, as illustrated in FIG. 7B, the spacing d1 between the contact portions 52 of the facing contacts 50 and the thickness t satisfy d1≥t. The same applies to the spacing d1 between the contact portions 53 of the facing contacts 50.

Thus, in this example, the ceramic element 30 can be inserted between the two insulators 40 without the need for an insertion force. That is, the ceramic element 30 can be inserted with a zero insertion force (ZIF). d1 may be set slightly smaller than t. In this case, the ceramic element 30 can be inserted with a slight insertion force. That is, the ceramic element 30 can be inserted with a low insertion force (LIF).

In a state in which connection of the connector 100 and the ceramic element 30 is completed, the sleeve 70 hangs over the free ends 62a of the two spring pieces 62, and elastically deforms the two spring pieces 62 so as to bring the free ends 62a closer to the insulators 40. As a result, the two insulators 40 located on the two surfaces of the base end portion 31 of the ceramic element 30 are pushed toward the ceramic element 30 by the flexed portions 62c of the two spring pieces 62 to tightly hold the base end portion 31 from two sides. That is, the two insulators 40 firmly hold the ceramic element 30. Additionally, the contact portions 52 and 53 of each contact 50 held by the insulator 40 are pushed against the terminal electrode 32 formed on the base end portion 31, which results in mutual electrical connection between the contact 50 and the terminal electrode 32.

Assuming here the fixed end 62b, the free end 62a, and the flexed portion 62c of the spring piece 62 as a fulcrum, a point of effort, and a point of application, respectively, of a lever, the flexed portions 62c can be pushed against the insulators 40 with a force larger than a force of the sleeve 70 for displacing the free ends 62a, as in the principle of a lever. That is, the contacts 50 can be brought into contact with the terminal electrodes 32 of the base end portion 31 with a force larger than the force of the sleeve 70 for displacing the free ends 62a. Thus, a large contact force and a large retaining force can be easily obtained. The force that displaces the free ends 62a may be relatively small.

The two spring pieces 62 is structured to hold the two insulators 40 and the base end portion 31 of the ceramic element 30 from two sides when elastically deformed. Thus, even if there is variation in dimensions among the insulators 40 or the ceramic elements 30, the structure accommodates the variation in dimensions, and a stable contact force is obtained. That is, the connector 100 is excellent in connection reliability between the connector 100 and the ceramic element 30 and is excellent in connection operability and can be connected to the ceramic element 30 with a small operational force.

Figure 4A:
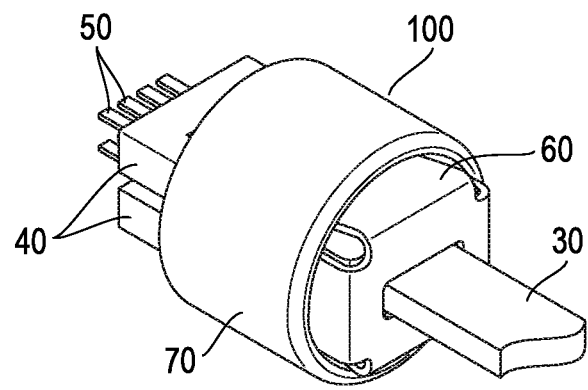
FIG. 4A is a perspective view of the connector to which the ceramic element is connected.
Figure 4B:
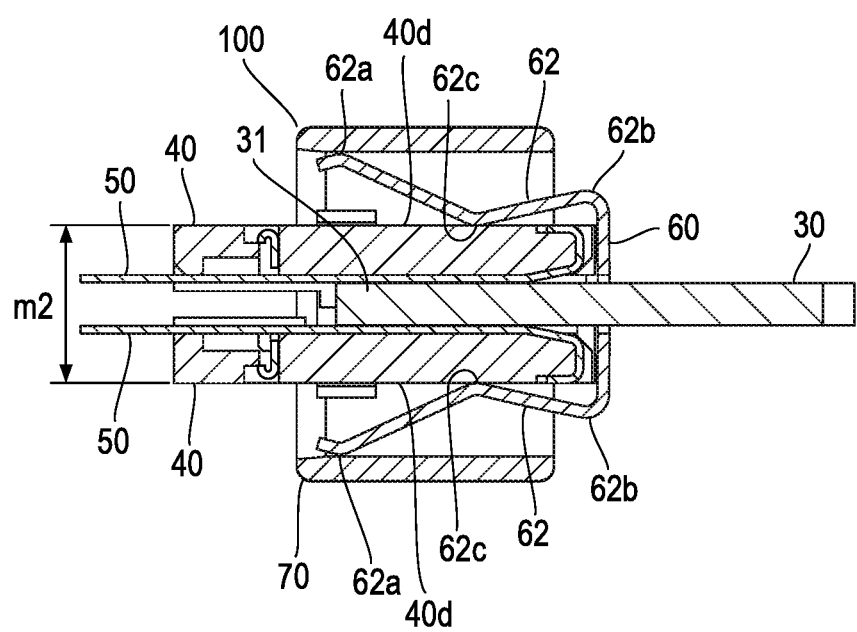
FIG. 4B is an enlarged sectional view of the connector to which the ceramic element is connected.

Letting m1 be a dimension between the upper surfaces 40d of the two insulators 40 in the state shown in FIG. 7B, and m2 be a dimension between the upper surfaces 40d of the two insulators 40 in the state shown in FIG. 4B, m2<m1 holds.

The lead wires for connection with an external apparatus are connected to the connection portions 56 of the contacts 50 of the connector 100, and the terminal electrodes 32 of the ceramic element 30 and the lead wires are electrically connected to each other by the connector 100.

A ceramic applied electronic device which includes the above-described connector 100 will next be described.

Figure 10:
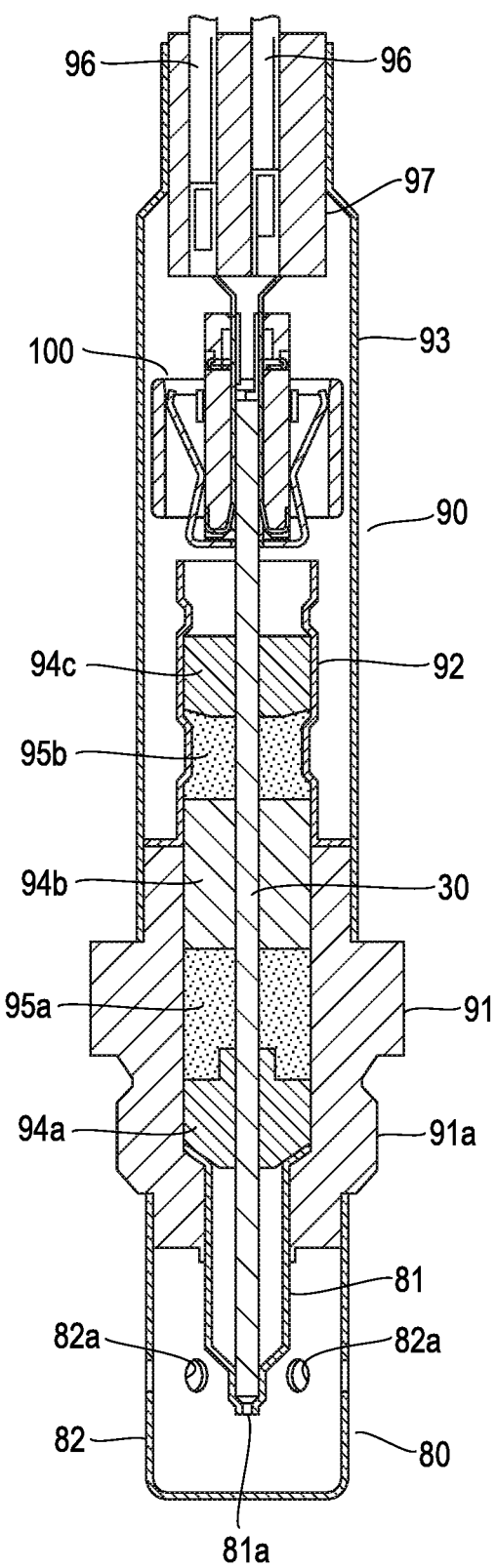
FIG. 10 is a sectional view of a ceramic applied electronic device.
Figure 11A:
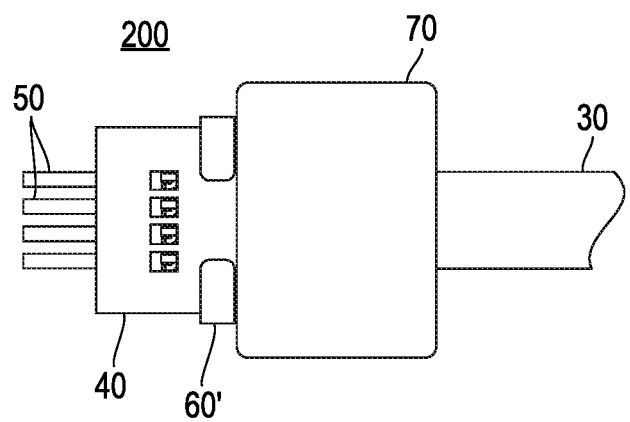
FIG. 11A is a plan view of a connector to which a ceramic element is connected.
Figure 11B:
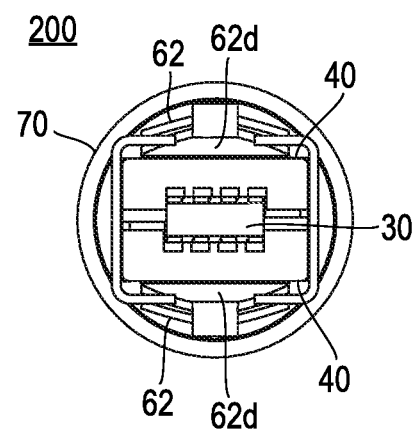
FIG. 11B is a left side view of the connector to which the ceramic element is connected.
Figure 11C:
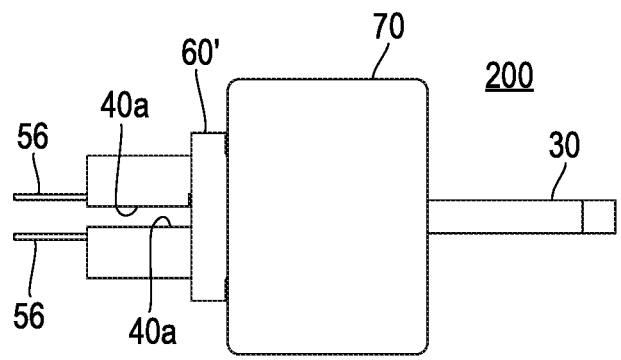
FIG. 11C is a front view of the connector to which the ceramic element is connected.
Figure 11D:
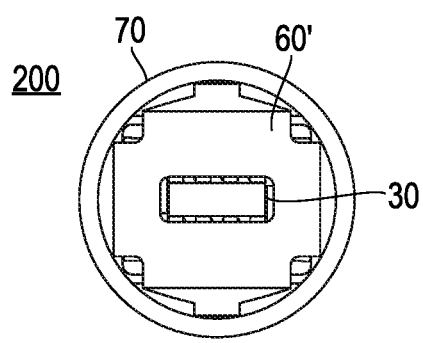
FIG. 11D is a right side view of the connector to which the ceramic element is connected.

FIG. 10 illustrates a gas sensor which is a ceramic applied electronic device according to the embodiment. The gas sensor includes the ceramic element 30 that detects a predetermined gas component from gas to be detected, a protective cover 80 which protects a distal end portion of the ceramic element 30, and a sensor assembly 90 which includes the connector 100 connected to the ceramic element 30.

The ceramic element 30 has an elongated plate-like shape and has, for example, a structure in which six ceramic substrates composed of oxygen-ion-conducting solid electrolyte layers made of yttria-stabilized zirconia are stacked.

The protective cover 80 includes an inner protective cover 81 which covers a distal end of the ceramic element 30 and an outer protective cover 82 which covers the inner protective cover 81. The inner protective cover 81 has a hole 81a for introduction of the gas to be detected at the distal end of the ceramic element 30, and the outer protective cover 82 has holes 82a for introduction of the gas to be detected at a side surface.

The sensor assembly 90 includes a main metal shell 91, an internal cylinder 92 and an external cylinder 93 which are fixed to the main metal shell 91 through welding, and the connector 100 that is connected to the base end portion 31 of the ceramic element 30. Referring to FIG. 10, although not illustrated in detail, reference character 91a denotes a threaded portion for mounting which is formed at the main metal shell 91.

Ceramic supporters 94a to 94c and ceramic powders 95a and 95b, with which a space between the ceramic supporters 94a and 94b and a space between the ceramic supporters 94b and 94c are filled, are enclosed in the internal cylinder 92. The external cylinder 93 surrounds the internal cylinder 92, a part of the ceramic element 30, and the connector 100. Lead wires 96 which are connected to the contacts 50 of the connector 100 are led out from the sensor assembly 90. The lead wires 96 are electrically connected to the terminal electrodes 32 of the ceramic element 30 via the connector 100. A gap between the external cylinder 93 and the lead wires 96 is sealed with a rubber plug 97.

The above-described gas sensor is mounted on, for example, an exhaust gas pipe of a vehicle and is used to detect a gas component (for example, $NO_x$ or $O_2$) contained in exhaust gas. Since the connector 100 is used to connect the ceramic element 30 and the lead wires 96, high-reliability electrical connection of the ceramic element 30 and the lead wires 96 is implemented. Additionally, mounting of the connector 100 on the ceramic element 30 is easy (good workability).

Another embodiment of a connector for connection of terminal electrodes of a ceramic element and lead wires will be described below.

Figure 12A:
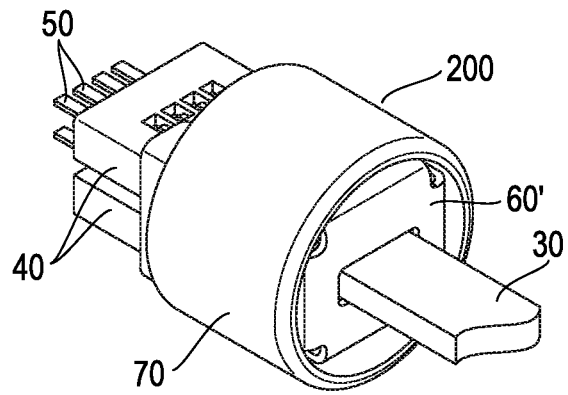
FIG. 12A is a perspective view of the connector to which the ceramic element is connected.
Figure 12B:
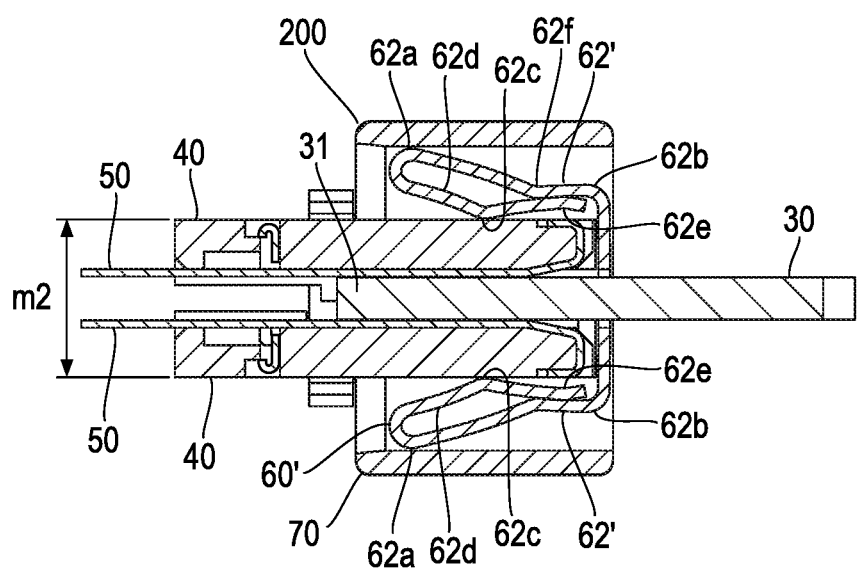
FIG. 12B is an enlarged sectional view of the connector to which the ceramic element is connected.
Figure 13:
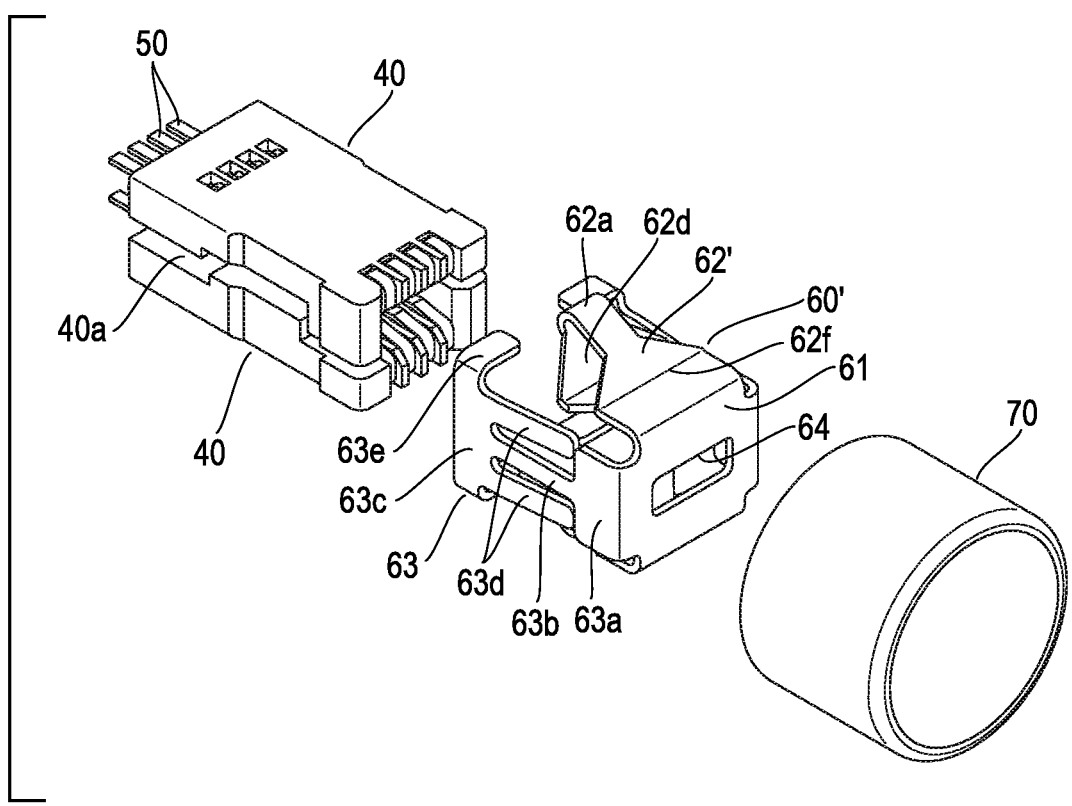
FIG. 13 is a perspective view of the connector which is partially exploded.
Figure 15:
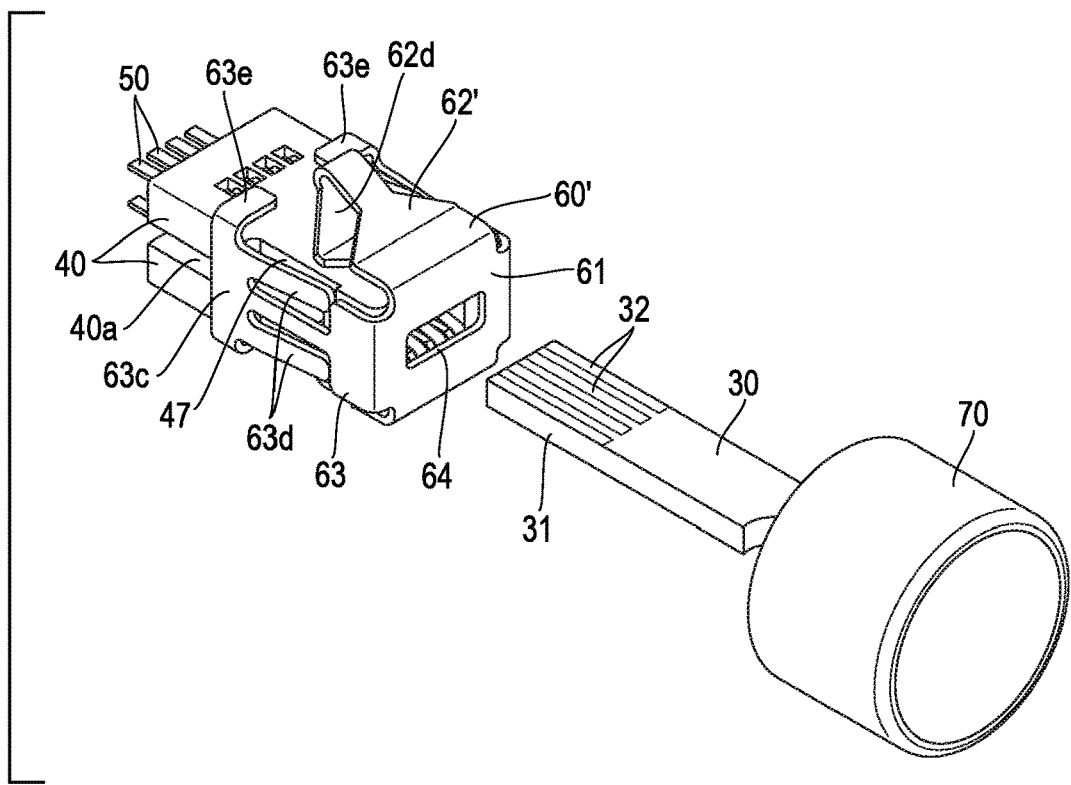
FIG. 15 is a perspective view of the connector to which the ceramic element is not connected.
Figure 16:
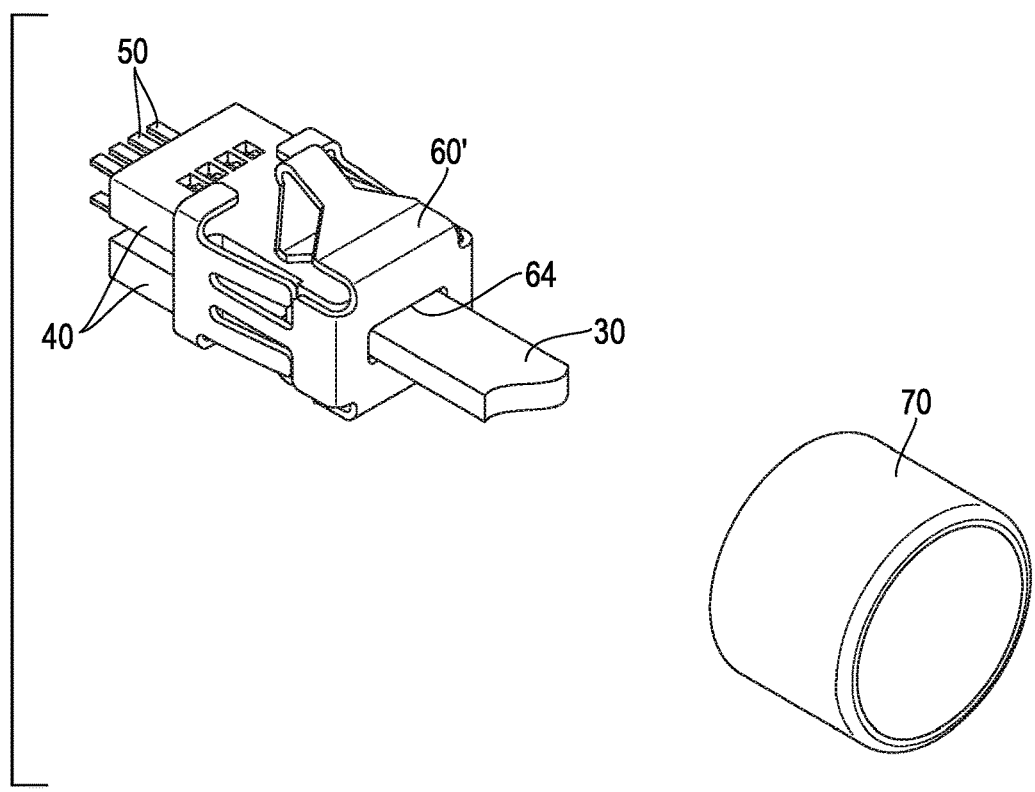
FIG. 16 is a perspective view of the connector to which a sleeve is not attached.

FIGS. 11A, 11B, 11C, 11D, 12A, and 12B illustrate a state in which a ceramic element 30 is connected to a connector 200. FIG. 13 is a partial exploded view of the connector 200. FIGS. 14A, 14B, and 15 illustrate a state before the ceramic element 30 is connected to the connector 200. FIG. 16 illustrates a state in which the ceramic element 30 is inserted between two insulators 40 of the connector 200. Same constituent elements as those of the connector 100 are denoted by same reference characters, and a detailed description thereof will be omitted.

The connector 200 is identical in configuration to the connector 100 except that shapes of two spring pieces 62' of a spring component 60' are different from those in the connector 100.

One of the two spring pieces 62' is a plate portion which is turned back by 180 degrees. A site located on an outer side of the plate portion has a flexed portion 62f which is bent so as to project inward near a fixed end 62b. A 180-degree bent portion located at a boundary between the site located on the outer side of the plate portion and a site located on an inner side of the plate portion is a free end 62a. The site (hereinafter referred to as a turnback portion 62d) located on the inner side has, at a middle portion, a flexed portion 62c which is bent so as to project inward. A distal end 62e of the turnback portion 62d is located near the fixed end 62b. The distal end 62e of the turnback portion 62d is slightly bent inward. The same applies to the other of the two the spring pieces 62'.

In a portion extending from the flexed portion 62f to the free end 62a of the spring piece 62', a portion near the free end 62a is a narrow rectangular plate portion, and a portion near the flexed portion 62f is a trapezoidal plate portion which decreases in width toward the free end 62a. A plate portion extending from the free end 62a to the flexed portion 62c is a trapezoidal plate portion which increases in width toward the flexed portion 62c. A plate portion extending from the flexed portion 62c to the distal end 62e is a trapezoidal plate portion which decreases in width toward the distal end 62e.

The connector 200 has the spring piece 62' having the turnback portion 62d. When the two spring pieces 62' are elastically deformed by the sleeve 70 hanging over the free ends 62a of the two spring pieces 62', the distal end 62e of each turnback portion 62d touches the site located on the outer side of the spring piece 62', as illustrated in FIG. 12B. For this reason, both a force applied to the free end 62a and a force applied to the distal end 62e act on the flexed portion 62c. Thus, the connector 200 is capable of more rigidly holding the base end portion 31 of the ceramic element 30 from two sides and bringing the contacts 50 into contact with the terminal electrodes 32 with a larger contact force than the connector 100 described earlier.

A shape of the sleeve 70 is not limited to a circular cylindrical shape and may be a cylindrical shape which is hollow and polygonal in sectional shape.

Addendum

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

Moreover, the use of the terms "first", "second", "i-th", etc., if any, do not denote any order or importance, but rather the terms "first", "second", "i-th", etc. are used to distinguish one element from another. The term "first" does not necessarily mean "coming before all others in order". The terminology used herein is for the purpose of describing particular embodiments only and is not intended to limit the invention in any way. As used herein, the singular forms "a", "an" and "the" are intended to include the plural forms as well, unless the context clearly indicates otherwise. It will be further understood that the terms "comprise", "comprises", and/or "comprising," when used in this specification and/or the appended claims, specify the presence of stated features, steps, operations, elements, and/or components, but do not preclude the presence or addition of one or more other features, steps, operations, elements, components, and/or groups thereof. The same goes for "include", "includes", and/or "including". The term "and/or", if any, includes any and all combinations of one or more of the associated listed items. In the claims and the specification, unless otherwise noted, "connect", "join", "couple", "interlock", or synonyms therefor and all the word forms thereof, if any, do not necessarily deny the presence of one or more intermediate elements between two elements, for instance, two elements "connected" or "joined" to each other or "interlocked" with each other. Connection between elements, if required, may be physical connection, electrical connection, or a combination thereof.

Unless otherwise defined, all terms (including technical and scientific terms) used herein have the same meaning as commonly understood by those skilled in the art to which the invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual techniques or steps in an unnecessary fashion. Nevertheless, the specification and claims should be read with the understanding that such combinations are entirely within the scope of the invention and the claims.

The corresponding structures, materials, acts, and equivalents of all means or step plus function elements in the claims below, if any, are intended to include any structure, material, or act for performing the function in combination with other claimed elements as specifically claimed.

The foregoing description of the embodiments of the invention has been presented for the purpose of illustration and description. It is not intended to be exhaustive and to limit the invention to the precise form disclosed. Modifications or variations are possible in light of the above teaching. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A ceramic applied electronic device comprising:
a ceramic element;
terminal electrodes on the ceramic element;
lead wires for connection with an external apparatus, the lead wires being led out from the ceramic applied electronic device;
two insulators, each holding contacts that are connected to the lead wires and being arranged on both surfaces of the ceramic element;
a spring component including a flat plate portion and two cantilever-shaped spring pieces extending in the same direction from the flat plate portion, and the flat plate portion having an opening for the ceramic element to pass therethrough; and
a cylindrical sleeve, wherein
each of the two cantilever-shaped spring pieces is folded 180 degrees and has an inside portion and an outside portion,
the inside portion of each of the two cantilever-shaped spring pieces includes, at a middle portion thereof, a flexed portion,
the spring component is attached to the two insulators and thereby the two cantilever-shaped spring pieces of the spring component pinch the two insulators, and
the two cantilever-shaped spring pieces of the spring component are elastically deformed toward the two insulators by an attachment of the cylindrical sleeve to the spring component to cause:
the flexed portion of each of the two cantilever-shaped spring pieces to push a corresponding one of the two insulators inward;

a distal end of the inside portion of each of the two cantilever-shaped spring pieces to contact with the outside portion thereof; and the two insulators to pinch the ceramic element from both sides so as to push the contacts of the two insulators against the terminal electrodes on the ceramic element.

2. A connector for connecting terminal electrodes on a ceramic element to lead wires, the connector comprising:

two insulators, each holding contacts for connection with the lead wires and being arranged on both surfaces of the ceramic element;

a spring component including a flat plate portion and two cantilever-shaped spring pieces extending in the same direction from the flat plate portion, and the flat plate portion having an opening for the ceramic element to pass therethrough; and a cylindrical sleeve, wherein each of the two cantilever-shaped spring pieces is folded 180 degrees and has an inside portion and an outside portion, the inside portion of each of the two cantilever-shaped spring pieces includes, at a middle portion thereof, a flexed portion, the spring component is attached to the two insulators and thereby the two cantilever-shaped spring pieces of the spring component pinch the two insulators, and the two cantilever-shaped spring pieces of the spring component are elastically deformed toward the two insulators by an attachment of the cylindrical sleeve to the spring component to cause:

the flexed portion of each of the two cantilever-shaped spring pieces to push a corresponding one of the two insulators inward;

a distal end of the inside portion of each of the two cantilever-shaped spring pieces to contact with the outside portion thereof; and the two insulators to pinch the ceramic element from both sides so as to push the contacts of the two insulators against the terminal electrodes on the ceramic element.

\* \* \* \* \*